United States Patent [19]

Durno

[11] 4,027,999
[45] June 7, 1977

[54] ANALOG MIXER TO VARY HELICOPTER ROTOR PHASE ANGLE IN FLIGHT

[75] Inventor: Ronald Arthur Durno, Trumbull, Conn.

[73] Assignee: United Technologies Corporation, Hartford, Conn.

[22] Filed: Nov. 13, 1975

[21] Appl. No.: 631,599

[52] U.S. Cl. .................. 416/40; 416/114; 416/115; 416/127

[51] Int. Cl.² .................................... B64C 27/80

[58] Field of Search ............ 244/17.13; 416/33, 40, 416/114, 115, 130, 127, 112, 113, 129

[56] References Cited

UNITED STATES PATENTS

| | | | |
|---|---|---|---|
| 2,546,881 | 3/1951 | Avery | 416/114 |
| 2,748,876 | 6/1956 | Daland et al. | 416/33 |
| 3,120,276 | 2/1964 | Culver et al. | 416/114 X |
| 3,146,970 | 9/1964 | Girard | 416/114 X |
| 3,199,601 | 8/1965 | Dean et al. | 416/130 X |
| 3,409,249 | 11/1968 | Bergquist et al. | 416/129 X |
| 3,521,971 | 7/1970 | Cheney | 416/33 X |
| 3,570,786 | 3/1971 | Lewis | 416/115 X |
| 3,620,488 | 11/1971 | Miller | 244/17.13 X |
| 3,799,695 | 3/1974 | Yamakawa | 416/40 |

FOREIGN PATENTS OR APPLICATIONS

| | | | |
|---|---|---|---|
| 878,912 | 2/1943 | France | 416/129 |
| 995,459 | 12/1951 | France | 416/115 |
| 791,474 | 3/1958 | United Kingdom | 416/112 |

Primary Examiner—Everette A. Powell, Jr.
Attorney, Agent, or Firm—Vernon F. Hauschild

[57] ABSTRACT

An analog mixer for a helicopter rotor control system mounted for tilting motion about a variable tilt axis and connected to the rotor control swashplate to cause synchronous tilting and including means to impart tilt generating control inputs to the analog mixer, and means to vary the position of the analog mixer tilt axis as a function of helicopter speed to thereby vary the phase angle of the helicopter rotor without imparting control inputs to the rotor control swashplate.

7 Claims, 14 Drawing Figures

LOOKING REARWARD

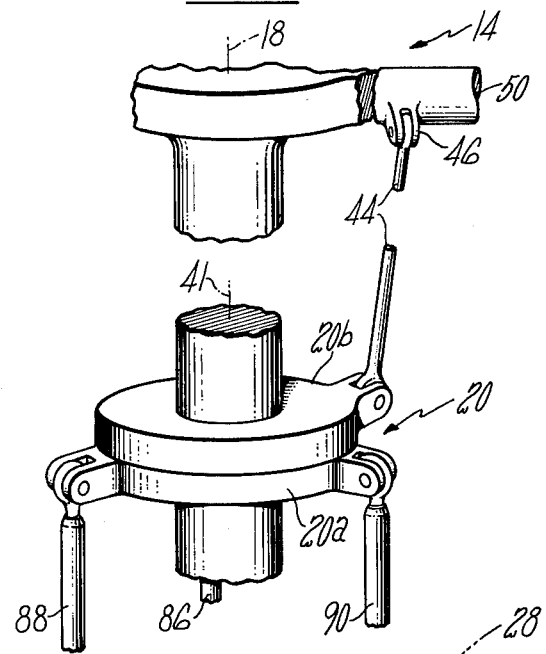
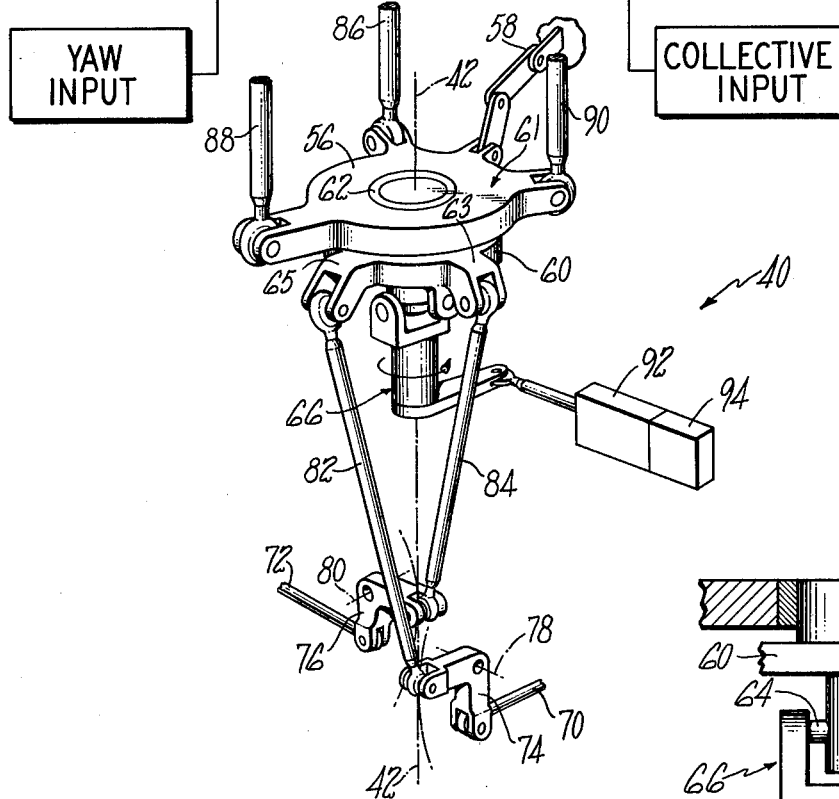
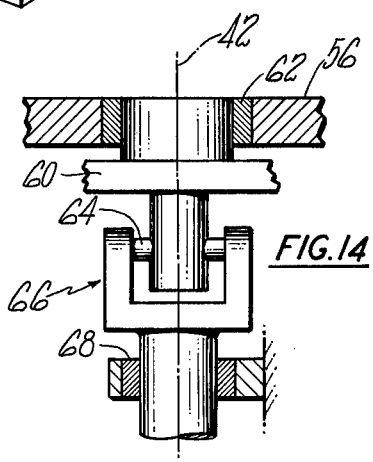

ANALOG MIXER TO VARY HELICOPTER ROTOR PHASE ANGLE IN FLIGHT

The invention herein described was made in the course of or under a contract or sub-contract thereunder, with the Department of the Army.

CROSS-REFERENCE TO RELATED APPLICATIONS

U.S. application Ser. No. 631,600 was filed on Nov. 13, 1975 herewith on an invention entitled "Control for Helicopter Having Dual Rigid Rotors", in the names of D. Cooper and R. Klingloff which shows, describes and claims some of the subject matter of this application.

BACKGROUND OF THE INVENTION

1. Field of the Invention This invention relates to helicopters and more particularly to an analog mixer to be used in the control system of a helicopter rotor to vary the phase angle thereof in flight as a function of helicopter speed.

2. Description of the Prior Art The only known prior art relative to the variation of helicopter rotor phase angle in flight is Girard U.S. Pat. No. 3,146,970 in which helicopter phase angle is varied in flight but not as a function of helicopter speed and not such as to achieve decoupling between phase angle variation and control output. Cheney U.S. Pat. No. 3,521,971 directs itself to the use of phase angle in helicopters, but not variable phase angle as a function of helicopter speed.

It has been known for some time that there are advantages to be gained by using counterrotating rigid rotors, however, the control of such rotors presented problems which had to be overcome to optimize performance and controllability. It has now been determined that this can be accomplished by varying rotor phase angle in flight as a function of helicopter forward speed. My analog mixer taught herein accomplishes that function efficiently, with minimal mechanical complication, with high reliability and without imparting any rotor control inputs to the rotor control system during the phase angle varying operation.

SUMMARY OF THE INVENTION

A primary object of the present invention is to provide an analog mixer which can be used in a helicopter rotor control system to vary rotor phase angle as a function of helicopter forward speed.

In accordance with the present invention, the analog mixer is basically a swashplate mechanism mounted so that it can be made to tilt about any selected tilt axis and being connected to the helicopter rotor swashplate to cause the rotor swashplate to tilt synchronously therewith about a selected cyclic pitch controlling tilt axis, and wherein cyclic pitch controls are imparted to the main swashplate through the analog mixer and where, most importantly, the tilting axis of the analog mixer can be selectively positioned as a function of helicopter forward speed so as to accomplish variation of the rotor phase angle as a function of helicopter forward speed without imparting cyclic control inputs from the analog mixer to the rotor swashplate.

It is a further object of this invention to teach an analog mixer for use in the control system of a helicopter rotor which operates in response to pilot cyclic pitch input to tilt about a selected tilt axis and to cause the rotor swashplate to similarly tilt to thereby impart cyclic control inputs to the rotor, and which performs the function of varying rotor phase angle in flight as a function of helicopter speed, and which has the capability of performing this phase angle varying function without imparting cyclic control input to the rotor.

Other objects and advantages of the present invention may be seen by referring to the following description and claims, read in conjunction with the accompanying drawings.

BRIEF DESCRIPTION OF THE DRAWINGS

FIG. 2 is a showing of the effects of lag angle in the upper and lower rotors, when not compensated for.

FIG. 3 is a showing of the operation of the upper and lower rotors when lag angle is compensated for.

FIG. 13. is a showing of the analog mixer used to vary rotor phase angle as a function of aircraft forward speed.

FIG. 14 is a cross-sectional showing through a portion of the analog mixer of FIG. 13.

DESCRIPTION OF THE PREFERRED EMBODIMENT

Figure 1:
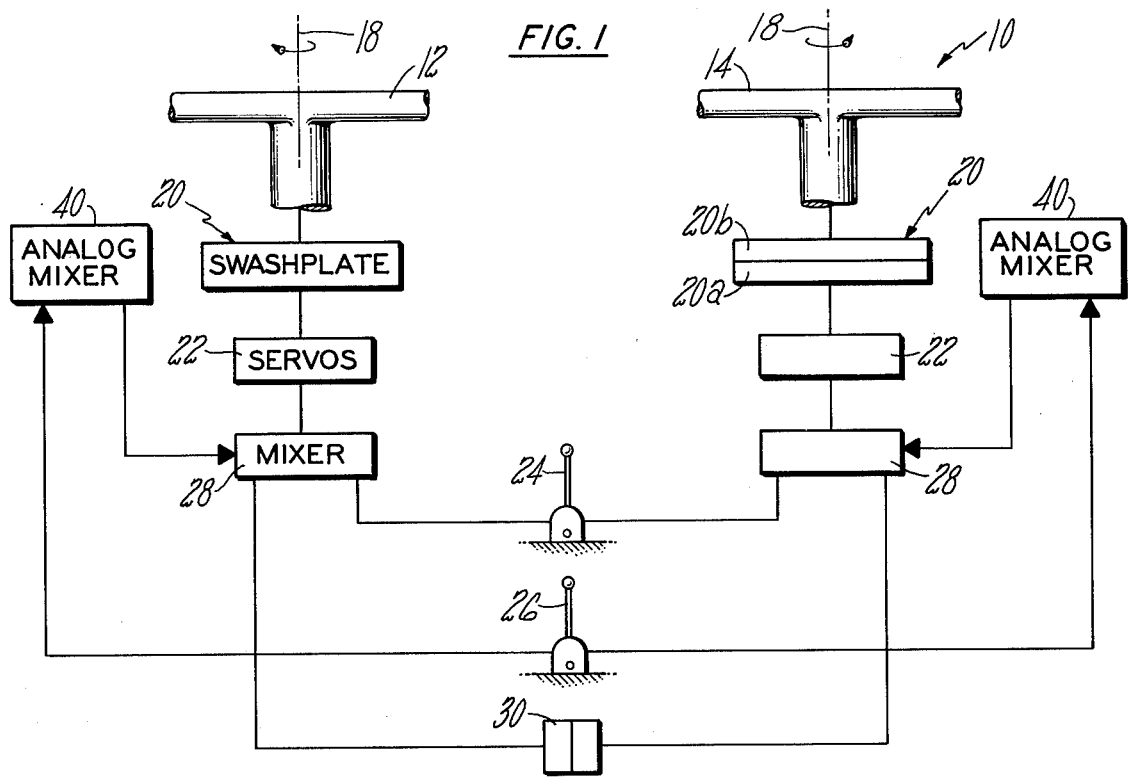
FIG. 1 is a schematic representation of a helicopter rotor control system utilizing the invention.

Referring to FIG. 1, we see dual, counterrotating, coaxial, rigid rotor and control system 10 which includes rigid rotors 12 and 14, which are supported in conventional fashion from a helicopter fuselage to generate lift by rotating about their common axis 18, although rotors 12 and 14 are shown side-by-side for purposes of illustration. Each of the rotors has its own control systems, which are preferably identical, and which include conventional swashplate assembly 20, which comprises stationary swashplate portion 20a and rotating swashplate portion 20b. Swashplate portion 20b is connected by conventional linkage to the pitch horns of the blades of rotors 12 and 14 so that motion of swashplate 20 along the rotor axis 18 will cause the rotor blades to vary pitch collectively and so that tilting of the swashplate 20 with respect to the axis 18 will cause the blades to vary pitch cyclically. Swashplate assembly 20 is caused to either translate, or tilt, or both by main servo mechanisms 22. Servo mechanisms 22 are controlled by inputs from the pilot collective stick 24, pilot cyclic stick 26, and foot pedals 30, which inputs are imparted to the servos 22 through mixer mechanism 28, cyclic stick 26 inputs having gone thru analog mixer 40.

To permit description of the rotor control system for the purpose of describing this invention, it is believed that the FIG. 1 showing and this description is adequate. Rotor and control assembly 10 may be of the type more fully disclosed in U.S. Pat. Nos. 3,409,249, 3,521,971 and 3,570,786.

In operation, and as described in greater particularity in the aforementioned patents, cyclic stick 26 is used to control helicopter pitch and roll. Collective stick 24 is used for vertical conrol, and pedals 30 are used for directional or yaw control. The collective stick 24 changes the blade pitch angle for each rotor equally for rotor thrust control. The cyclic stick 26 changes the blade angle cyclically and equally on each rotor for rotor pitch and roll moment control. Longitudinal cyclic input results in pitch maneuver and lateral cyclic input results in roll maneuver. The foot pedals 30 change the blade angles collectively but equally and oppositely on each rotor for directional or yaw control. Yaw is produced by the action of pedals 30 increasing collective pitch on upper rotor 14 and decreasing it on lower rotor 12 so that the torque generated by upper rotor 14 in a counterclockwise direction is greater to thereby produce a nose left yawing moment on the aircraft. A nose right yawing moment is created by pedals 30 increasing the collective pitch on lower rotor 12 and decreasing the collective pitch on upper rotor 14. For the purposes of future description, rotor 14 will be considered to be the upper rotor and rotating in a counterclockwise direction, as viewed from above, while rotor 12 is the lower rotor and rotating in a clockwise direction as viewed from above. The helicopter does not react instantaneously to a pilot initiated pitch angle change (feathering) of blades. The development of the maximum blade bending and helicopter control moment lags the blade pitch angle change, due to the flexibility of the blades of rotors 12 and 14. The significance of this lag may best be appreciated by viewing FIG. 2. Let us assume that we wish to impose a pitching moment over the nose of the helicopter, that is at azimuth angle 180°, and we therefore change blade pitch as the blade passed the azimuth 180° position. Due to the aforementioned lag in developing the control moment, the helicopter would not receive the maximum control moment from that blade pitch change at the nose or 180° azimuth location but, rather, at some angular location in the direction of blade rotation therefrom, for example, $180° + \theta$, at the azimuth location M as shown in FIG. 2.

Figure 2:
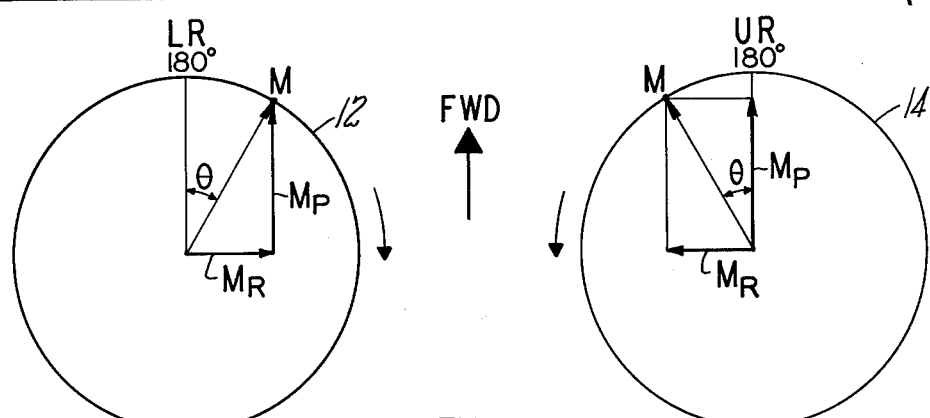
Figure 3:
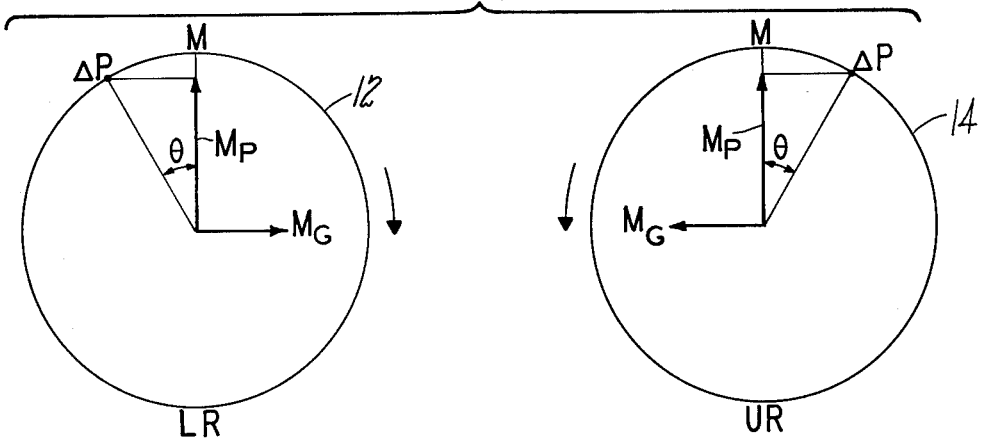
Figure 4:
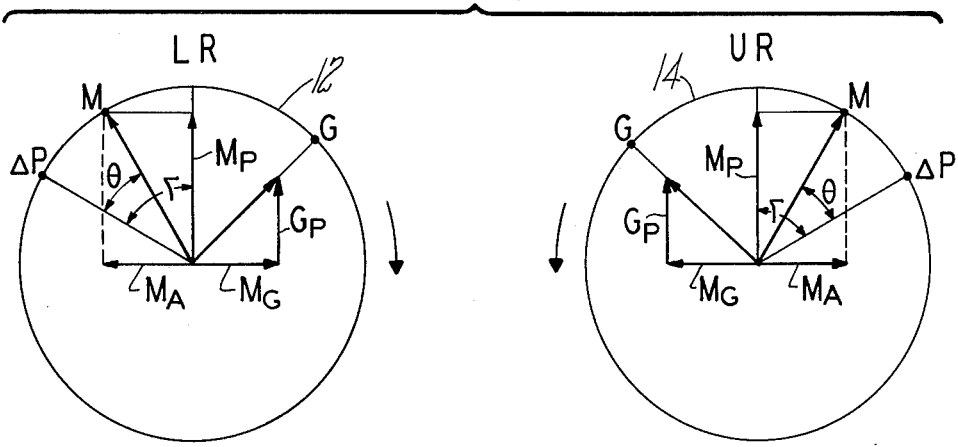
FIG. 4 demonstrates the use of phase angle to generate an aerodynamic moment in the upper and lower rotors to cancel the gyroscopic moments generated therein during aircraft maneuver.

By viewing FIG. 2, it will be noted that as a result of lag of angle $\theta$ forward (longitudinal) displacement of the cyclic stick 26 will produce both pitching moment ($M_P$) and roll moment ($M_R$) components on each rotor. The pitching moments $M_P$ are collective and produce the desired pitching acceleration in the aircraft. Since rotors 12 and 14 rotate in opposite directions, the roll moment components $M_R$ created by longitudinal cyclic stick motion cancel, but they produce undesirable bending stresses on each rotor shaft. Lay angle $\theta$ is about 30° for this type of rotor blade. These intershaft bending stresses can be minimized by adjusting each rotor swashplate 20 to account for the control moment lag. If the swashplate 20 of each rotor is repositioned in a direction opposite the rotor rotation an amount equal to the lag angle $\theta$ as shown in FIG. 3, maximum control moment $M_P$ in the desired 180° azimuth direction only will be developed, and intershaft bending will be reduced. By viewing FIG. 3 it will be evident that moment $M_P$ only has been developed in rotors 12 and 14 because the moment input lies along the fore-and-aft or longitudinal line of the aircraft, passing through the nose (180° azimuth position). As FIG. 3 illustrates, by this application of pitch change, no roll moment component $M_R$ is generated. However, as a result of the aircraft pitch acceleration additional moments identified as $M_G$ will be produced as a result of the gyroscopic precession characteristic of the rotors. While the roll producing tendencies of the upper rotor moment will be cancelled by that of the lower rotor, adverse blade bending stresses and deflections will result. As taught by Cheney, if the swashplates 20 are adjusted to a considerably larger angle, for example, to about double that shown in the FIGS. 2 and 3 illustrations to a phase angle gamma $\Gamma$, the results shown in FIGS. 4 and 5 will be achieved. Namely, reoriented aerodynamic moments will be produced automatically which will balance the adverse blade bending moments due to gyroscopic moments created by changes in aircraft attitude during maneuvering flight. In this fashion, excessive rotor blade stresses are avoided, and blade tip clearance is maintained during maneuvers. FIG. 4 illustrates the effect of applying a control pitch change input at azimuth station $\Delta P$ of rotors 12 and 14 so as to develop a blade bending moment due to aerodynamic forces at azimuth station M. Moment M so developed in FIG. 4 can be vectorized as shown into pitch change moments $M_P$, which cause blade pitching motions, and lateral aerodynamic moments $M_A$, which corresponds to the roll moment $M_R$ illustrated in FIG. 2. It must be borne in mind that in the FIG. 4 illustration, the helicopter is in maneuver mode of operation and is accordingly changing attitude in response to the moments imposed thereon. It is a characteristic of helicopter rotors, as fully explained in Cheney U.S. Pat. No. 3,521,971, that a gyroscopic moment is imposed upon the helicopter in response to attitude change at an azimuth station G which is 90° forward of the attitude changing moments M. The gyroscopic moment illustrated at station G can be vectorized into additive gyroscopic pitch moments $G_P$, which cooperate with the aerodynamically imposed pitch moments $M_P$ to cause pitching motions of the aircraft, and lateral gyroscopic moment $M_G$, corresponding to roll moment $M_R$ in FIG. 2. It will be noted by viewing FIG. 4 that in each of rotors 12 and 14 the aerodynamic induced roll moment $M_A$ cancels the gyroscopic roll moment $M_G$, thereby cancelling the blade bending moments caused by those gyroscopic forces created during maneuvering flight operation. FIG. 4 thus demonstrates that by the proper selection of phase angle gamma, differential pitch coupling which produce aerodynamic moments $M_A$ will automatically be generated in each rotor which will cancel the adverse effects produced by the gyroscopic moment $M_G$ developed during maneuver operations. It will be evident to those skilled in the art that aerodynamic moment $M_A$ of FIG. 4 will always reduce the effect of gyroscopic moment $M_G$, and will cancel it when $M_A = M_G$.

Figure 5:
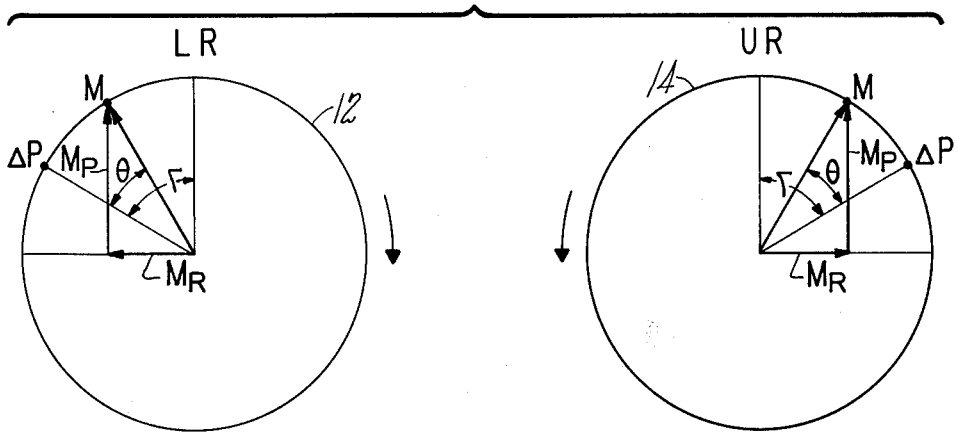
FIG. 5 demonstrates the use of phase angle during steady state operation to produce differential lateral cyclic blade pitch between the rotors to cancel roll moment and position the lift vector of each rotor for optimum lift-to-drag ratio performance.

FIG. 5 illustrates the benefit to be gained automatically by the selected phase angle gamma equal to the FIG. 4 phase angle during steady state operation rather than maneuvering operation. By viewing the FIG. 5 illustration wherein the phase angle gamma is again substantially larger than the lag angle $\theta$, we see that in steady state operation, when control input produces blade pitch change at station $\Delta P$, differential pitch coupling develops aerodynamic moment $M_A$ on each rotor at station M. This aerodynamic moment can be vectorized into additive pitch moment $M_P$ and cancelling rolling moments $M_R$. The roll moments $M_R$ when produced are aerodynamic moments which produce differential lateral cyclic control inputs to rotors 12 and 14 to selectively position the lift vectors L on each rotor 12 and 14 so as to also produce optimum lift-to-drag ratio to optimize rotor efficiency.

It will accordingly be noted by viewing FIGS. 4 and 5 that by utilizing a selected phase angle gamma, an aerodynamic moment $M_A$ is developed during aircraft maneuver operation which will cancel or minimize the gyroscopic moment $M_G$ developed by change of aircraft or rotor attitude during maneuver and will also produce during steady state operation differential lateral cyclic pitch to optimally position the lift vector of each rotor to produce optimum lift-to-drag ratio of the rotors.

Figure 6:
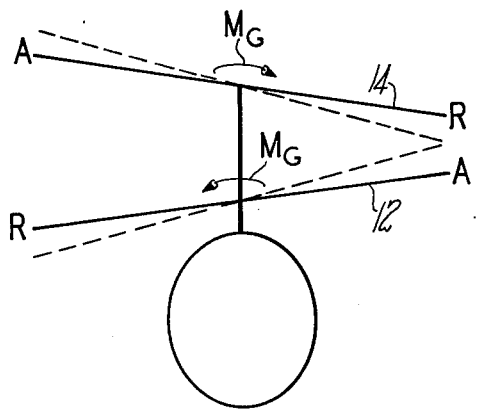
FIG. 6 is a front view of a helicopter using dual, rigid, counterrotating, coaxial rotors to show the effects of gyroscopic moments created on the rotors during maneuver operation and to show the stabilizing results of generating an aerodynamic moment to compensate gyroscopic moment.

The significance of cancelling the gyroscopic moment $M_G$ as described in connection with FIG. 4 will be best appreciated by viewing FIG. 6, which is a front view of a helicopter using coaxial, counterrotating, rigid rotors and with the gyroscopic moments $M_G$ imposed as illustrated to cause the rotors 12 and 14 to move from their solid line positions to their dotted line gyroscopically loaded positions and thereby bring the advancing blade A of rotor 12 and the retreating blade R of rotor 14 into close proximity. The automatic introduction of differential lateral pitch coupling as a function of a longitudinal pitch input will produce aerodynamic moments which will act equally and oppositely to the gyroscopic precession generated moments $M_G$. Such action permits the rotors to remain in their FIG. 6 solid line positions where they present no tip clearance problems and experience minimal blade and intershaft stress. FIG. 6 demonstrates that the offset lift vector to produce optimum lift-to-drag rotor performance produces rotor canting as shown in solid lines and this is why cancellation of gyroscopic moments is very important to maintain adequate tip clearance, especially at high speed.

Figure 7:
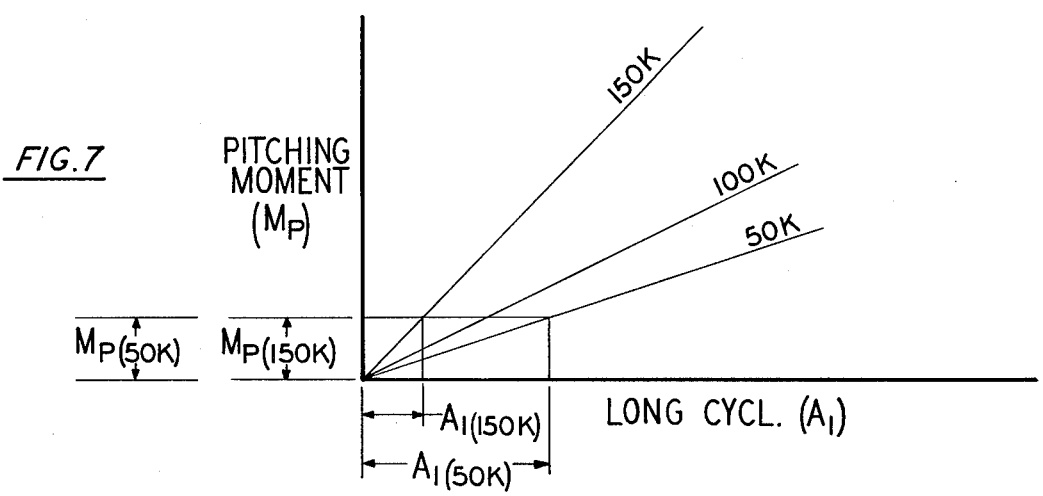
FIG. 7 is a graph of longitudinal cyclic pitch A, and pitching moment $M_P$ for various aircraft forward speed operating regimes.
Figure 8:
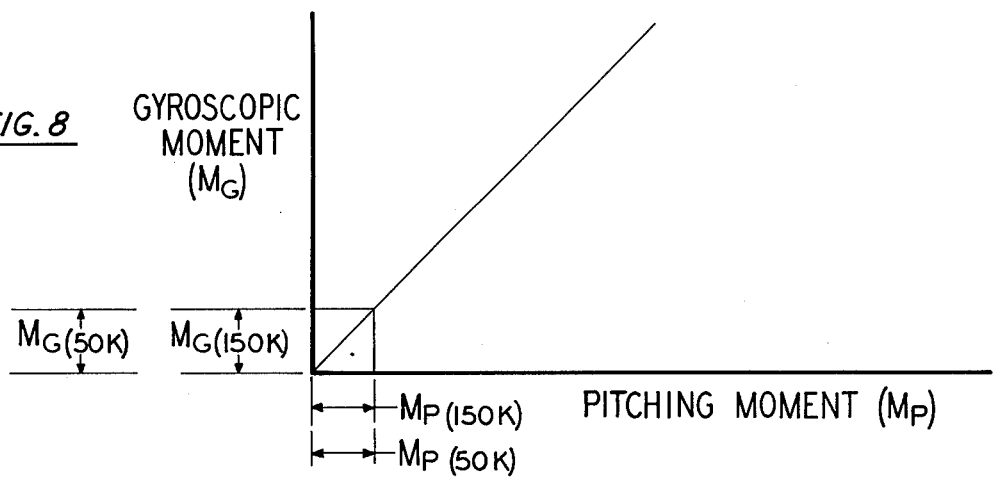
FIG. 8 is a graph of pitching moment $M_P$ and gyroscopic moment $M_G$.
Figure 9:
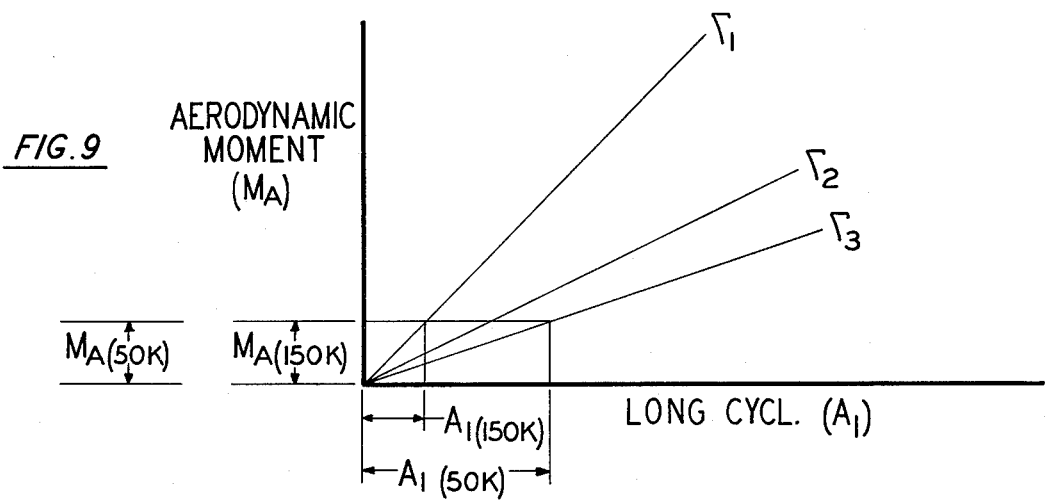
FIG. 9 is a graph of longitudinal cyclic pitch A and aerodynamic moment $M_A$ for various rotor phase angles.

While Cheney taught that a fixed phase angle be used to counteract gyroscopic moments produced during helicopter maneuvering, we have discovered that it is preferred to vary phase angle in flight as a function of helicopter forward speed V in order to achieve optimum L/D and stall margins at all speeds; gyroscopic cancellation, particularly at high speed; and a lack of requirement for separate differential lateral cyclic. This need is best understood by viewing FIGS. 7, 8 and 9. An explanation of FIGS. 7–9 will illustrate that for a given aircraft maneuver, such as a one radian/sec$^2$ maneuver, different rotor phase angles need be used to produce aerodynamic moments to cancel or minimize the gyroscopic moments created during this maneuver as the forward speed V of the helicopter changes. We will first consider this maneuver when the helicopter is operating at 150 knots. As shown in FIG. 7, a longitudinal cyclic control input $A_1$ (150k) is required to produce the pitching moment or pitching acceleration $M_P$ (150k) to initiate the maneuver. Viewing FIG. 8, we see that the pitching moment $M_P$ (150k) produced in FIG. 7 produces a gyroscopic moment $M_G$ (150k). Now viewing FIG. 9, we note that the same longitudinal cyclic input $A_1$ (150k) as in FIG. 7 will produce an aerodynamic moment $M_A$ (150k) equal to gyroscopic moment $M_G$ (150k) when a large phase angle $\Gamma_1$ is used.

Now, let us assume that the helicopter is operating at a forward speed of 50 knots rather than at 150 knots as in the original illustration, and the pilot decides to perform the same one radian/sec$^2$ maneuver. At forward velocity V of 50 knots, a greater amount of longitudinal cyclic pitch $A_1$ (50k) will have to be imposed to produce this maneuver. FIG. 7 shows that $A_1$ (50k) produces the same pitching moment $M_P$ (50K) as at 150k. It will be noted that $M_P$ (150k) is equal to $M_P$ (50k) since the same maneuver is being executed. Now going to FIG. 8 and imposing our pitching moment $M_P$ (50k) thereon, it will be noted that a gyroscopic moment $M_G$ (50k) is produced which is equal to $M_G$ (150k). By viewing FIG. 9, it will be noted that when we impose the same longitudinal cyclic pitch inputs $A_1$ (50k) as in FIG. 7 we need to have a smaller phase angle $\Gamma_3$ to produce an aerodynamic moment $M_A$ (50k) which will cancel the gyroscopic moment $M_G$ (50k). It will be obvious by viewing FIG. 9 that had our phase angle remained at $\Gamma_1$ during both the 150 knot and 50 knot maneuver, an aerodynamic moment would have been developed at the 50 knot maneuver which would have been considerably larger than the gryoscopic moment so that moment cancellation would not occur.

Figure 10:
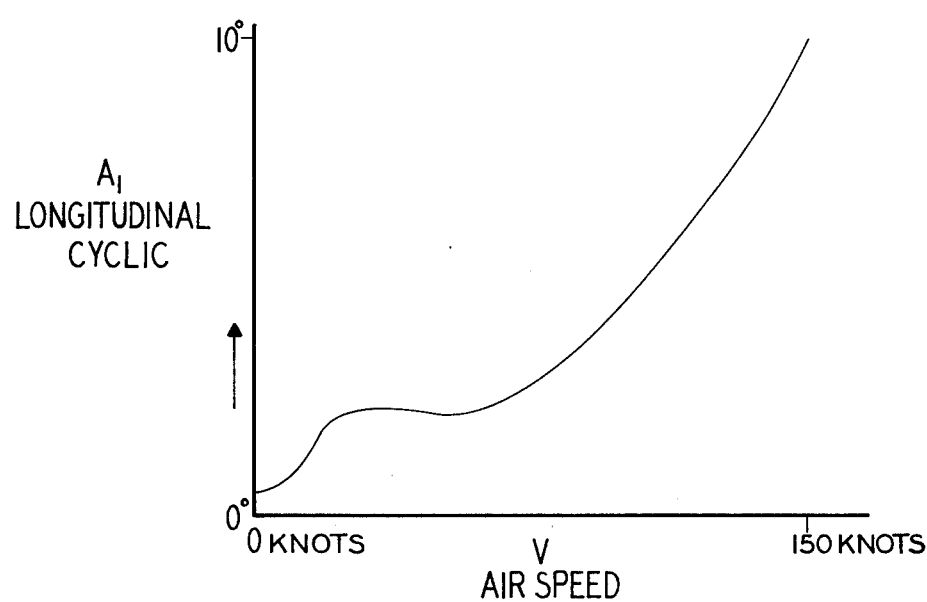
FIG. 10 is a graph showing the longitudinal cyclic pitch required to overcome drag and produce table flight attitude for an aircraft having dual, counter-rotating, coaxial rigid rotors at forward flight operation between hover and 150 knots.
Figure 11:
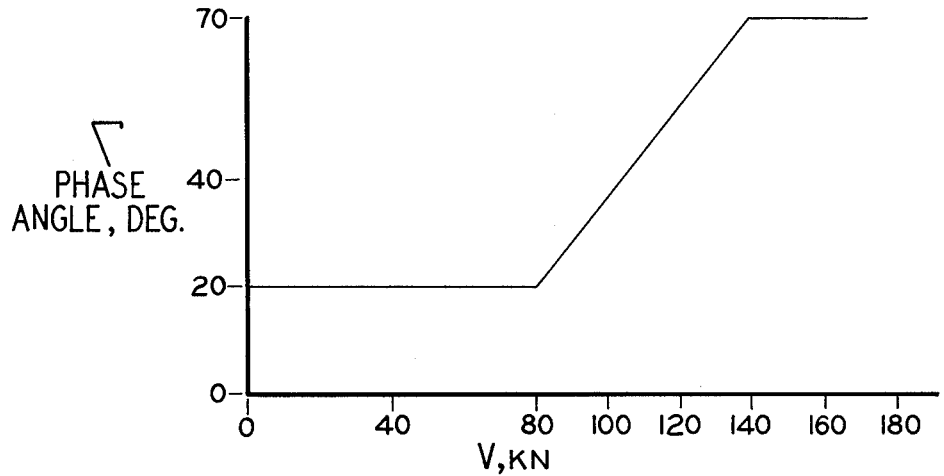
FIG. 11 is a graph showing the rotor phase angle required to produce optimum rotor performance and controllability between hover and 160 knots.
Figure 12:
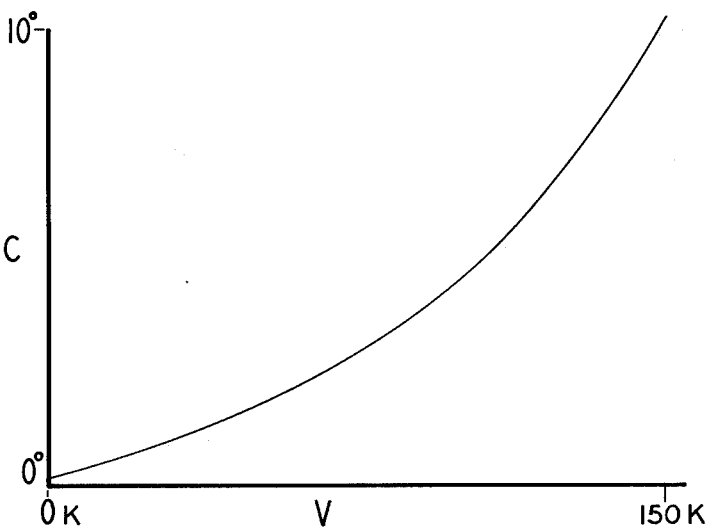
FIG. 12 is a graph showing the differential lateral cyclic pitch input required to produce optimum performance and controllability between hover and 150 knots including cancelling the roll moments and selectively positioning the rotor lift vectors to produce optimum lift-to-drag ratio, and cancelling the gyroscopic moments created during the maneuver.

We have discovered that it is a characteristic of a helicopter using this type of rotor system that, as best shown in FIG. 10, varying degrees of longitudinal cyclic input are required to overcome aircraft drag and put the aircraft in equilibrium at all forward speeds. From the Bergquist patent it is known that the proper amount of differential lateral cyclic pitch input required to produce the optimum lift vector offset is substantially as represented in FIG. 12. Through analytical and developmental work with a helicopter powered by a counter rotating, coaxial, rigid rotor, we have determined that for gyroscopic moment cancellation or minimization, the phase angel $\Gamma$ of rotors 12 and 14 need be varied to produce optimum performance and controllability of the aircraft throughout the flight regime. The curve of FIG. 11 provides a programmed phase angle variation which is addressed to meeting these three criteria. A phase angle of about 20° is used for the flight regime between hover and about 80 knots, the phase angle is gradually increased to 70° in a flight range between about 80 knots and about 140 knots, and a phase angle of about 70° is used for a flight regime between about 140 and about 160 knots. FIG. 11 shows our presently preferred phase angle variation but it will be evident that there are acceptable variations on each side thereof. The FIG. 11 curve is the presently preferred curve and takes into account vibration and trim consideration to produce the results and advantages discussed supra.

This programmed phase angle variation thus serves to couple longitudinal cyclic pitch and lateral cyclic pitch as described in connection with FIG. 5 so that the application of longitudinal cyclic pitch input required to overcome aircraft drag and maintain the aircraft in equilibrium at all forward flight speeds and illustrated in FIG. 10 will automatically produce differential lateral cyclic pitch in rotors 12 and 14 to thereby achieve the desired differential lateral cyclic in accordance with the curve shown in FIG. 12 so that the differential lateral cyclic pitch derived thereby at the various aircraft speeds will serve to produce offset lift vectors positioned in accordance with the dictates of the FIG. 12 graph to produce optimum lift-to-drag ratio operation, and hence maximum efficiency operation and controllability of rotors 12 and 14. In addition, as illustrated in FIG. 4, the gyroscopic moment cancellation, in whole or in part, will be accomplished as described heretofore.

Rotor phase angle is preferably caused to vary in flight as a function of aircraft speed V by means of an analog mixer 40 which is shown schematically connected to the swashplate 20 of each rotor in the FIG. 1 schematic and one of which is shown in detail in FIGS. 13 and 14. The analog mixer 40 will be described as it applies to rotor 14 only, since the analog mixer used for rotor 12 is identical thereto. Analog mixer 40 is connected to the nonrotating portion 20a of swashplate 20, which supports rotating swashplate portion 20b for rotation therefrom about axis 41. Swashplate rotating portion 20b is connected in conventional fashion by push rod members 44 to the pitch horn 46 of each blade 50 of rotor 14.

When swashplate 20 translates with respect to axis 41, it causes all blades 50 to change pitch simultaneously in collective pitch change action. When swashplate 20 pivots about any horizontal axis passing through axis 41, it causes cyclic pitch variations to the blades 50. Analog mixer 40 is connected to swashplate 20 and serves the function of varying the rotor phase angle gamma ($\Gamma$) by establishing the horizontal axis about which swashplate 20 will be caused to tilt by longitudinal and lateral cyclic control inputs from pilot cyclic control stick 26. Mixing unit 28 is preferably positioned between analog mixer 40 and swashplate 20 and is of conventional design to combine cyclic and collective inputs and so that the cyclic control output of mixer 40 is imparted to swasplate 20 with any required coupling, gain or the like, to produce the required phase angle shift as a function of forward speed V.

Analog mixer 40 consists of upper nonrotating member 56 which is connected to the fuselage or otherwise prevented from rotation about mixer axis 42 by scissors member 58. Lower rotatable plate member 60 is joined to nonrotatable member 56 by an internal antifriction bearing 62, best shown in FIG. 14, thereby permitting member 60 to rotate about axis 42 with respect to nonrotating member 56. Lower plate member 60 is joined to the trunnion 64 of universal joint member 66, which is supported from the fuselage or other fixed member within antifriction bearing 68 so as to be free to rotate about mixer axis 42, which is preferably vertical. Universal joint 66 permits members 56 and 60 to pivot in unison about any horizontal axis passing through axis 42 as directed by control inputs. Further, when universal joint 66 rotates about axis 42, it causes plate 60 to rotate about axis 42 with respect to plate 56. These plate members 56 and 60 are caused to tilt or pivot about a selected horizontal axis by control input motions imparted thereto by either pilot lateral cyclic pitch input member 70 or longitudinal cyclic input member 72. Members 70 and 72 cause bellcranks 74 and 76 to pivot about axes 78 and 80 and thereby cause input rods 82 or 84 to provide lateral or longitudinal cyclic control input motion to swashplate members 56 and 60, thereby causing those plates to pivot or tilt about a selected horizontal axis. Input rods 82 and 84 are joined to bellcrank 74 and 76 and to swashplate member 60 by spherical bearings. Rods 82 and 84 connect to swashplate member 60 at azimuth stations spaced 90° apart. Nonrotating member 56 is connected to nonrotating member 20a of the main swashplate through mixer unit 28 in conventional fashion so that the tilting motion about a selected tilting axis which is imparted to the analog mixer swashplate members 56 and 60 is similarly and precisely imparted to the main swashplate 20 so as to establish the selected cyclic pitch change in blades 50. Analog mixer member 40 is schematically shown connected to swashplate 20 through mixer unit 28 by rod members 86, 88, and 90.

In operation, analog mixer 40 is caused to change the phase angle of rotor 14 as a function of aircraft flight speed V by the use of actuator mechanism 92, which is programmed by aircraft speed sensing mechanism 94 to cause universal joint 66 and hence swashplate 60 to rotate with respect to swashplate member 56 about axis 42, thereby establishing the horizontal axis about which swashplates 56-60 and hence main swashplate 20 will tilt in response to cyclic inputs from the pilot control rods 70 and 72. The selection of this horizontal axis about which the swashplate member 20 tilts determines the station $\Delta P$ in the rotor azimuth at which blade pitch change takes place as a result of cyclic stick inputs, and hence determines the phase angle gamma ($\Gamma$) of the rotor. By programming acutuator 92 from aircraft speed responsive member 94, it will be seen that the rotor phase angle is caused to vary in flight as a function of aircraft forward speed V.

It is an important teaching of this invention that the operating radii of bellcranks 74 and 76 be coincident with analog mixer axis 42 so that the phase change rotation of member 60 by aircraft speed responsive mechanism 92-94 will cause control rods 82 and 84 to merely translate along the surface of a cone and thereby avoid imparting any undesired control inputs to the rotor during phase change variation of the analog mixer 40.

While the analog mixer 40 is shown used with the rigid rotor in this application, it will evident to those skilled in the art that it is equally applicable for use with a hinged or any other type of rotor capable of having its phase angle changed.

While I have described my invention in relation to a counterrotating, coaxial rigid rotor for helicopters, it will be evident to those skilled in the art that the teaching herein is equally applicable to any counterrotating, rigid rotor system and to rotors other than used in the helicopter field.

Throughout the description, I have talked about moment cancellation but it will be evident to those skilled in the art that complete moment cancellation will be achieved only under selected circumstances and that moment cancellation is otherwise partially achieved so that the effects of undesired moments are minimized.

I wish it to be understood that I do not desire to be limited to the exact details of construction shown and described, for obvious modifications will occur to a person skilled in the art.

I claim:
1. An analog mixer adapted to be used with the controls of a helicopter rotor to vary phase angle thereof comprising:
   A. a swashplate assembly mounted concentrically about a first axis for tilting motion about all tilting axes intersecting said first axis and lying in a plane normal thereto and including:
      1. a nonrotatable member mounted to be tiltable about one of said tilting axes so that its tilting motion may be utilized to supply control inputs to a helicopter control, and to be restrained from rotating about said first axis, and
      2. a rotatable member mounted to be tiltable with the said nonrotatable member, and to be rotatable about said first axis,
   B. control input means adapted to provide control tilt creating inputs to said rotatable member at two azimuth stations separated by 90° and including:
      1. first control means including a final link member having a first end connected to one such station of said rotatable member and a second end mounted for control motion along said first axis only so that uncoupled tilting motion will be imparted thereby to said swashplate assembly about a first of said tilting axes, and
      2. second control means including a final link member having a first end connected to the other of said stations of said rotatable member and a second end mounted for control motion along said first axis only, so that uncoupled tilting motion will be imparted thereby to said swashplate assembly about a second of said tilting axes normal to said first of said tilting axes, and
   C. means to cause said rotatable member to rotate about said first axis to thereby vary the azimuth location of said two stations and hence the first and second of said tilting axes about which said first and second control means cause said swashplate assembly to tilt.

2. An analog mixer according to claim 1 wherein said last named means is aircraft speed responsive so that said control input means stations will be positioned in azimuth as a function of aircraft speed.

3. An analog mixer adapted to be used with a helicopter rotor control system to vary the phase angle of the main swashplate thereof including:
   A. a first member mounted concentrically and restrained from rotation about a first axis and for tilting motion about all tilting axes intersecting said first axis and lying in a plane perpendicular to said first axis,
   B. a second member mounted to so tilt in unison with said first member and for concentric rotation about said first axis,
   C. means adapted to connect the first member to a main swashplate of a helicopter control system to cause tilting thereof and thereby impart cyclic pitch input thereto,
   D. first means to impose a tilting force to said second member at a first azimuth station thereon to thereby cause tilting motion of said first and second members about a first of said tilting axes,
   E. second means to impose a tilting force to said second member at a second azimuth station spaced 90° from said first azimuth station to thereby cause tilting motion of said first and second members about a second of said tilting axes perpendicular to and in the same plane as said first of said tilting axes,
   F. each of said first and second means including a rod member having a first end connected to said second member at one of said azimuth stations and a bell crank member connected to the other end of said rod member and mounted so that the control input operating radius of the bell crank member is coincident with said first axis, and
   G. means to cause said second member to rotate about said first axis so as to selectively position said first and second stations and hence said first and second tilting axes.

4. An analog mixer according to claim 3 wherein said last named means includes helicopter speed sensing means and is operable to cause rotation of said second member and hence analog mixer tilting angle variation as a function of helicopter speed.

5. A helicopter rotor control including:
   A. a rotor pitch controlling swashplate assembly mounted to tilt about selected tilting axes to cause rotor cyclic pitch variation,
   B. means to impart tilting motion control input to said rotor swashplate assembly and vary the tilting axis and hence the phase angle thereof as a function of helicopter speed comprising:
      1. an analog mixer including:
         a. a first member mounted concentrically and restrained from rotation about a first axis and for tilting motion about all tilting axes intersecting said first axis and lying in a plane perpendicular to said first axis,
         b. a second member mounted to so tilt in unison with said first member and for concentric rotation about said first axis,
         c. means connecting the first member to said rotor swashplate assembly to cause tilting thereof in response to first member tilting and synchronously therewith,
         d. first means to impose a tilting force to said second member at a first azimuth station thereon to thereby cause tilting motion of said first and second members about a first of said tilting axes,
         e. second means to impose a tilting force to said second member at a second azimuth station spaced 90° from said first azimuth station to thereby cause tilting motion of said first and second members about a second of said tilting axes perpendicular to and in the same plane as said first of said tilting axes,
         f. each of said first and second means including a rod member haviang a first end connected to said second member at one of said azimuth stations and a bell crank member connected to the other end of said rod member and mounted so that the control input operating radius of the bell crank member is coincident with said first axis, and
         g. means to cause said second member to rotate about said first axis so as to selectively position said first and second stations and hence said first and second tilting axes.

6. An analog mixer according to claim 5 wherein said last named means includes helicopter speed sensing means and is operable to cause rotation of said second member and hence analog mixer tilting angle variation as a function of helicopter speed.

7. A helicopter rotor control including:
A. a rotor pitch controlling swashplate assembly mounted to tilt about selected tilting axes to cause rotor cyclic pitch variation,
B. means to impart tilting motion control input to said rotor swashplate assembly and vary the tilting axis and hence the phase angle thereof as a function of helicopter speed comprising:
  1. an analog mixer comprising:
    a. a mixer swashplate assembly mounted concentrically about a first axis for tilting motion about all tilting axes intersecting said first axis and lying in a plane normal thereto and including:
      1. a nonrotatable member mounted to be tiltable about one of said tilting axes so that its tilting motion may be utilized to supply control inputs to a helicopter control, and to be restrained from rotating about said first axis, and
      2. a rotatable member mounted to be tiltable with the said nonrotatable member, and to be rotatable about said first axis,
    b. control input means adapted to provide control tilt creating inputs to said rotatable member at two azimuth stations separated by 90° and including:
      1. first control means including a final link member having a first end connected to one such station of said rotatable member and a second end mounted for control motion along said first axis only, so that uncoupled tilting motion will be imparted thereby to said mixer swashplate assembly about a first of said tilting axes, and
      2. second control mens including a final link member having a first end connected to the other of said stations of said rotatable member and a second end mounted for control motion along said first axis only, so that uncoupled tilting motion will be imparted thereby to said mixer swashplate assembly about a second of said tilting axes normal to said first of said tilting axes, and
    c. means to cause said rotatable member to rotate about said first axis to thereby vary the azimuth location of said two stations and hence the first and second of said tilting axes about which said first and second control means cause said swashplate assembly to tilt, and
    d. means connecting said nonrotatable member of said mixer swashplate assembly to said rotor swashplate assembly to cause synchronous tilting thereof with tilting of said nonrotatable member and to vary rotor phase angle as a function of azimuth locations of said two stations.

* * * * *